United States Patent [19]

Marquet et al.

[11] Patent Number: 5,173,934
[45] Date of Patent: Dec. 22, 1992

[54] COMMUNICATIONS ADAPTOR FOR A REMOTE ACTION TERMINAL

[75] Inventors: Alain Marquet, Lardy; Jacques Tanguy, Antony, both of France

[73] Assignee: Alcatel CIT, Paris, France

[21] Appl. No.: 844,886

[22] Filed: Mar. 3, 1992

Related U.S. Application Data

[63] Continuation of Ser. No. 514,486, Apr. 25, 1990, abandoned.

[30] Foreign Application Priority Data

Apr. 25, 1989 [FR] France ................. 89 05466

[51] Int. Cl.[5] ......................................... H04M 11/00
[52] U.S. Cl. ...................................... 379/93; 379/104; 379/105
[58] Field of Search .................. 379/93, 104, 105, 106, 379/100, 107

[56] References Cited

U.S. PATENT DOCUMENTS

| | | | |
|---|---|---|---|
| 3,586,778 | 6/1971 | Riethmeier et al. | 379/100 |
| 3,842,207 | 10/1974 | Fretwell | 379/105 |
| 4,332,980 | 6/1982 | Reynolds et al. | 379/107 |
| 4,415,774 | 11/1983 | Driver | 379/93 |

FOREIGN PATENT DOCUMENTS

| | | |
|---|---|---|
| 0050451 | 4/1982 | European Pat. Off. |
| 0295029 | 12/1988 | European Pat. Off. |

OTHER PUBLICATIONS

IEEE Global Telecommunications Conference, New Orleans, Dec. 2-5, 1985, vol. 3, paper 46.7, pp. 1439-1442, IEEE, New York, U.S.; J. P. Carise et al.: "Astarte-Telematic Secured Access to the Teleaction Network".

Commutation & Transmission, vol. 8, No. 2, 1986, pp. 65-78, Paris, France, J. P. Carise et al.: "Astarte: Un Reseau Multiservice de Teleaction".

Mini-Micro Systems, vol. 17, No. 3, Mar. 1984, pp. 184-186, 188, Denver, Colo., U.S.; H. Morgan: "Two-Wire Full-Duplex Modem Simplifies Voice and Data Networking".

*Primary Examiner*—James L. Dwyer
*Assistant Examiner*—Ahmad F. Matar
*Attorney, Agent, or Firm*—Sughrue, Mion, Zinn, Macpeak & Seas

[57] ABSTRACT

A communications adaptor for a remote action terminal connected to a telephone line in parallel with a telephone set in order to interchange remote action data with at least one server via the telephone line and a remote action network to which the server is connected, the data being interchanged using a frequency band different from that used by the signals relating to the telephone set, the adaptor including a binary data transmitter/receiver operating by frequency shift keying between two frequencies and the remote action network likewise including a binary data transmitter/receiver operating by frequency shift keying between the same two frequencies, dialog taking place in alternation between the transmitter/receivers by interchange of signals. The adaptor also includes a remote signalling device provided with means for causing signalling to be transmitted by the adaptor indicating that an absence of dialog has been observed for longer than a predetermined period of time.

4 Claims, 2 Drawing Sheets

COMMUNICATIONS ADAPTOR FOR A REMOTE ACTION TERMINAL

This is a continuation of application Ser. No. 07/514,486 filed Apr. 25, 1990, now abandoned.

The invention relates to a communications adaptor for a remote action terminal.

The term "remote action" is used to cover a set of various applications such as remote surveillance, remote control at very great distance, remote measurement, and remote management, in all of which short messages are interchanged between terminal apparatuses and specialized servers which are interconnected by one or more single- or multi-service telecommunications networks.

BACKGROUND OF THE INVENTION

In a known embodiment, remote action terminals are connected in parallel with telephone sets so as to take advantage of the infrastructure of the telephone network, and in particular of pre-existing telephone lines for transmitting remote action signals and telephone signals over the same telephone lines, but over separate frequency bands in order to avoid interaction.

Servers are connected to ports of the remote action network. Other ports of the remote action network are connected to first ends of telephone lines via couplers which are complementary to other couplers at the subscriber end whereby the remote action terminals are themselves connected in parallel with telephone sets at the other ends of the telephone lines.

In most applications, it is important for the servers to be able to verify the presence of the terminals and their ability to communicate under remote control in order to avoid sending messages pointlessly to a terminal which is disconnected or incapable of communicating adequately.

Steps are therefore taken to perform continuous checking so that both the servers and the terminals are informed of failures that could disturb or prevent information interchange.

This is preferably done with a high degree of security by using devices which are simple and reliable.

SUMMARY OF THE INVENTION

The present invention provides a communications adaptor for a remote action terminal connected to a telephone line in parallel with a telephone set in order to interchange remote action data with at least one server via the telephone line and a remote action network to which the server is connected, the data being interchanged using a frequency band different from that used by the signals relating to the telephone set, said adaptor including a binary data transmitter/receiver operating by frequency shift keying between two frequencies and the remote action network likewise including a binary data transmitter/receiver operating by frequency shift keying between the same two frequencies, dialog taking place in alternation between the said transmitter/receivers by interchange of signals, wherein the adaptor also includes a remote signalling device provided with means for causing signalling to be transmitted by the adaptor indicating that an absence of said dialog has been observed for longer than a predetermined period of time.

BRIEF DESCRIPTION OF THE DRAWINGS

An embodiment of the invention is described by way of example with reference to the accompanying drawings, in which.

DETAILED DESCRIPTION

Figure 1:
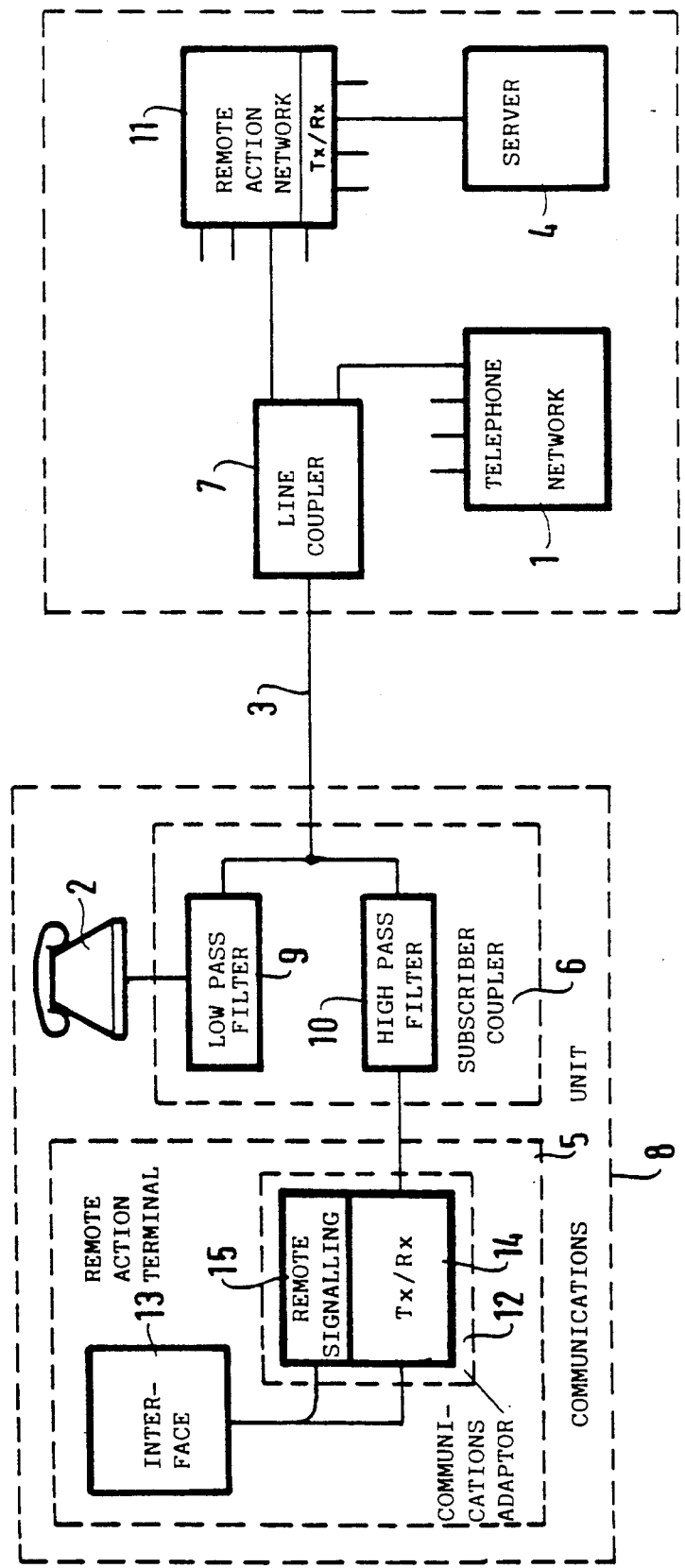
FIG. 1 is a block diagram of an assembly associating a remote action system with a telecommunications system.

The block diagram of FIG. 1 shows an example of how a remote action system may be organized around a generally pre-existing telecommunications system.

The system comprises a telephone network 1 organized around at least one automatic exchange (not shown) for enabling telephone terminals or sets symbolized in this case by a telephone set 2 to be put into communication with one another. Each telephone set 2 is connected to a parent exchange in the telephone network 1 by means of a telephone line 3.

The remote action system includes at least one server 4 and a plurality of remote action terminals such as 5 with which the server may communicate via a remote action network 11.

Insofar as the existing geographical coverage of telephone networks is very wide, and in order to avoid installing new links to existing subscribers for applications capable of using the existing transmission media, provision is made to use the lines which connect telephone sets 2 to their parent exchanges for the purpose of transmitting remote action signals to the premises in which the telephone sets are housed.

By connecting a remote action terminal 5 to the subscriber end of a telephone line 3 in parallel with a telephone set 2 on the same premises as those in which the telephone set is installed, it is possible to put the remote action terminal into communication with a distant server 4 so long as the remote action network 11 to which the server is connected is capable of being connected to the exchange end of the telephone line and so long as the remote action signals are not confused with telephone signals. This latter requirement may be satisfied, for example, by transmitting remote action signals in a "superphonic" band outside the telephone band.

A subscriber coupler 6 and a line coupler 7 situated at opposite ends of the telephone line 3 serve to separate telephone traffic from remote action traffic at both ends of the line.

The subscriber coupler 6 connects the telephone set 2 and the remote action terminal 5 to the line 3, and together with them it forms a part of a communications unit 8 housing various apparatuses connected to said line on the premises where the telephone set is situated.

The subscriber coupler 6 essentially comprises two filters 9 and 10 connected in parallel to the end of the telephone line 3 and connected individually to the telephone set 2 and to the remote action terminal 5, respectively. The coupler feeds the line 3 with telephone band signals from the telephone set 2 and with signals in the superphonic band from the remote action terminal 5. It directs the telephone band signals it receives from the line 3 to the telephone set 2 via a lowpass type filter 9, and it directs the superphonic band signals it receives from the line 3 to the remote action terminal 5 via a highpass type filter 10.

The line coupler 7 is similar to the subscriber coupler 6, serving to combine telephone signals and remote action signals going to the communications unit 8, and separating the signals it receives from the line 3 as a function of frequency, directing them either to the telephone network 1 or else to the remote action network 11 having the server 4 connected to a port thereof.

In the exchange, it is preferable to use a specialized network 11 rather than the telephone network 1 since a plurality of servers 4 may deal with a large number of remote action terminals via concentrators (not shown), and such an arrangement is not described in greater detail herein since it is only of indirect relevance to the present invention.

The line coupler 7 is thus connected to a port on each of the networks 1 and 11 and it thus receives signals which are located in non-interfering frequency bands.

The signals in the superphonic band travelling between the remote action terminal 5 and the line 3 via the filter 10 are transmitted or received by a communications adaptor 12 in said terminal. To this end, the adaptor is connected to an interface 13 which provides the link between the terminal and its environment which includes both equipment and people.

For example, the interface 13 may be organized around a logic circuit normally constituted by a processor and memories enabling the remote action terminal 5 to perform instructions by means of actuators, to receive instructions, e.g. via a keyboard, to take measurements by means of sensors, and to interchange information with one or more servers 4 which control it remotely and which it keeps informed over the line 3.

To this end, the interface 13 is provided with a bothway connection with the communications adaptor 12 which converts on/off encoded logic signals transmitted by the interface into signals which are binary encoded by frequency shift keying for the purpose of being transmitted over the superphonic band by the line 3, and which forms conversion in the opposite direction for signals transmitted over the same superphonic band by the line to the remote action terminal 5.

It should be observed that the communications adaptor 12 and the coupler 6 may be associated with the remote action terminal 5 and with the telephone set 2 in various different equivalent ways. In the embodiment shown, the communications adaptor 12 is assumed to be integrated in the remote action terminal with the interface 13 and possibly also with the coupler 6, but in comparable manner the communications adaptor 12 could be integrated with the coupler 6 in a module which is separate both from the telephone set 2 and from the remote action terminal 5, or it could be integrated together with the coupler in the telephone set.

In the example shown, the communications adaptor 12 which interchanges digital signals with the interface 13 communicates with the network 11 at a low data rate via the telephone line 3 by using binary encoded signals based on frequencies F1 and F2 situated in the superphonic band, e.g. at equal frequency distances from a central frequency of fifty-five kilohertz.

A transmitter/receiver 14 generates and detects signals at the frequencies F1 and F2 for transmission over or transmitted from the telephone line 3.

For a given application, the communications supervised by the network 11 are triggered by the network which cyclically interrogates the remote action terminal 5 concerned by the application. Transmission takes place over the telephone line 3 in one direction at a time in alternation, with one time period being attributed to the network and with the next time period being attributed to the terminal.

A remote signalling device 15 is associated with the transmitter/receiver 14 in the communications adaptor 12 in order to inform the the server 4 controlling the application under consideration about the effective presence or otherwise of the terminal at the end of the telephone line 3 by sending signals over the network 11 to which the remote action terminal 5 is connected. The server takes whatever measures are determined for the application under consideration whenever a remote action terminal does not respond, for example it may trigger an alarm in the event of the terminal failing to respond to an interrogation, assuming that the terminal is a remote surveillance terminal.

Figure 2:
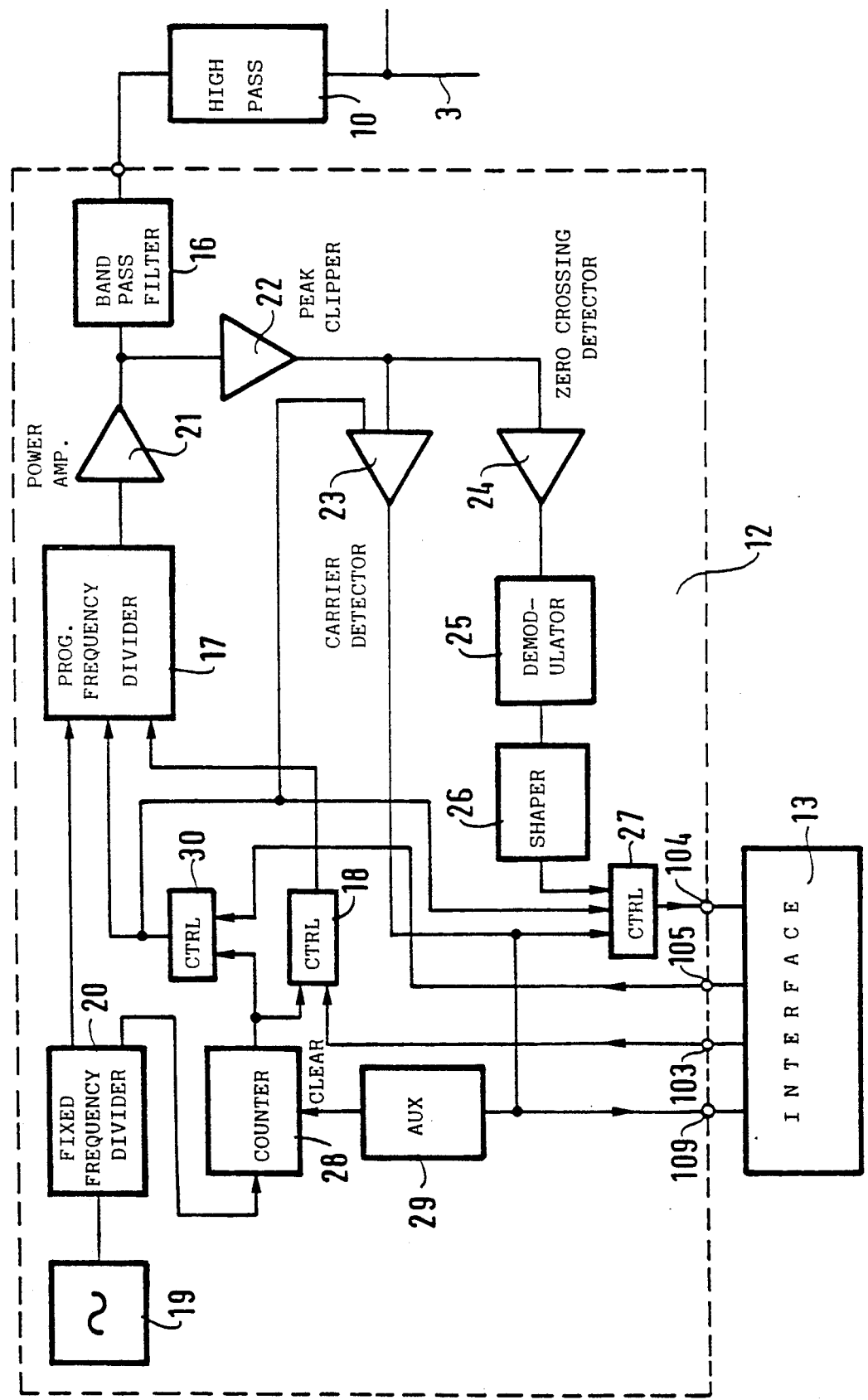
FIG. 2 shows a communications adaptor of the invention for a remote action terminal.

FIG. 2 is a block diagram of a communications adaptor 12 associated firstly with an interface 13 for linking a remote action terminal with its environment and secondly with a highpass filter 10 which connects it to a telephone line 3.

As mentioned above, the communications adaptor 12 includes a transmitter/receiver for taking the binary logic signals it receives from the interface 13 and applying them to the network 11 in the form of frequency shift keying using two frequencies F1 and F2, and also for receiving signals in that form from the network 11 and transcoding them into binary logic signals suitable for the interface 13.

To this end, the adaptor is connected to the interface 13 by at least four wires referenced 103, 104, 105, and 109 serving respectively: to transfer data from the interface to the adaptor, to transfer data in the opposite direction, to send a transmission request from the interface, and to send a carrier-present message as detected by the adaptor, which occurs whenever the network 11 is transmitting over the telephone line 3 in the selected superphonic band.

The communications adaptor 12 is also connected to the highpass filter 10, and at the end of the filter which is distant from the line 3, the adaptor includes a bandpass filter 16 which filters the remote action terminal signals transmitted or received in the superphonic band over the line 3.

The binary data received at a low data rate from the interface 13 over the wire 103 is transcoded into frequency shift keying from one or other of the frequencies F1 and F2 as a function of individual logic values.

To this end, the wire 103 is connected to a control input of a programmable frequency divider 17 via a control port 18.

The clock input to the programmable divider 17 receives signals from an oscillator 19 via a fixed frequency divider 20 having a plurality of outputs. The clock signals applied to the programmable divider 17 may be at a frequency of about one megahertz, for example, and this frequency is reduced to values of about fifty-three and fifty-seven kilohertz in order to obtain the signals F1 and F2 depending on the binary logic level one or zero of the signal provided at the control input of the programmable divider 17 by the wire 103.

The signals at the frequencies F1 or F2 as produced in alternation by the programmable divider 17 are transmitted to the telephone line 3 via a power stage 21 and via the filters 16 and 10 connected in series.

The power stage 21 may be constituted, for example, by two parallel triggers associated with a resistor divider bridge in order to obtain power and impedance matching with the bandpass filter 16 for signals at the frequencies F1 and F2, with the conventional details of this stage not being shown herein.

The filter 16 is a passive filter whose conventional structure is not shown either, but it is essentially constituted by two coils associated with a set of capacitors in order to limit and to shape the spectrum at each of the two signal frequencies F1 and F2 prior to applying them to the telephone line 3, with the filter also including a transformer for providing metallic isolation between the line 3 and the remote action terminal, and also contributing to the filtering.

The signals received by the remote action terminal from the line 3 are transmitted by the bandpass filter 16 to a receiver stage after being filtered by the filter 16 which is common to transmission and to reception.

To this end, an amplifier and peak-clipping circuit 22 is connected to the filter 16 at a common point which it shares with the outlet from the power stage 21. This amplifier and peak-clipping circuit 22 may be constituted, for example, by two amplifiers associated with a peak-clipping diode circuit in a conventional configuration (not shown).

The output signal from the amplifier and peak-clipping circuit 22 is applied to the input of a carrier detector circuit 23, e.g. based on a comparator connected as a peak detector and which provides a binary logic signal indicative that it has detected a signal being received at a level greater than a predetermined receive level, which level is itself fixed by a resistor divider bridge in conventional manner, not shown.

The output signal from the amplifier and peak-clipping circuit 22 is also applied to an input of a zero crossing detector 24 which is situated upstream from a demodulator 25.

The detector 24 is organized, for example, around a comparator which receives both the output signal from the amplifier and peak-clipping circuit 22 and a predetermined signal present on an input that is not shown, and which derives squarewave signals therefrom with a mark-space ratio of one and a frequency of F1 or F2 depending on the frequency of the received signal. These squarewave signals are applied to the input of the demodulator 25 which is constituted, for example, by a shift register receiving a signal from the divider 20 on a clock input and the squarewave signals on a data input, and having two outputs which are offset from each other applied to the two inputs of an exclusive OR type gate, with the shift register, the gate, and the connection to the divider 20 being omitted from the drawing.

The output from the demodulator 25 provides a signal whose mark-space ratio varies as a function of the difference between the frequency of the received signal and a central frequency for which the mark-space ratio is one, said central frequency being about fifty-five kilohertz in the example mentioned above.

A shaping circuit 26 serves to convert the signal it receives from the demodulator 25 into a binary signal of value zero or one as a function of the frequency F1 or F2 received by the amplifier and peak-clipping circuit 22. The shaping circuit 26 comprises, for example, a second order lowpass filter which serves to remove undesired high frequencies and to restore the low frequency component of the signal in the form of a sequence of squarewave pulses which, after shaping by means of a comparator, are applied to an inverter whose output delivers the binary signal for the interface 13.

The binary signal provided by the shaper circuit 26 and corresponding to received data passes through a control gate 27 and the wire 104 prior to reaching the interface 13. The gate 27 has a first input connected to the output of the shaper circuit 26, a second input connected to the output of the carrier detector circuit 23, and a third input connected via a control gate 30 to the wire 105 conveying the transmit request signal from the interface 13 so as to transmit data to the interface 13 only during time intervals for which signals are being received from the line 3. When the transmit request signal from the interface 13 disappears during a period of dialog between the network 11 and the remote action terminal 5, and at the end of a period of transmission by the communication adaptor 12, data transfer to the interface 13 is authorized via the gate 27 so long as received data signals activate the carrier detector circuit 23.

The output signal from the carrier detector circuit is also applied to a reset-to-zero input of a counter 28 via an auxiliary circuit 29. This is a conventional reset-to-zero circuit for ensuring that the counter 28 is not cleared by interference pulses, and it is constituted, for example, by a resistor and a diode connected in parallel between the wire 109 and the reset-to-zero input of the counter 28, together with a capacitor inserted between said input and a zero potential point of the adaptor 12.

The counter 28 receives a clock signal from the divider 20, which signal serves to produce another clock signal at a very long period, e.g. about two minutes. In the absence of the counter 28 being forced to zero, the clock signal produced by the counter has a mark-space ratio of one, and the half period during which it is at zero level begins when the counter is in the zero state. The counter 28 is forced to zero by the carrier detector circuit 23 whenever a carrier is detected as coming from the line 3.

Its output signal is applied to the gate 30 which is also connected to the wire 105 conveying the transmit request signal from the interface 13. The output signal from the gate 30 is applied to a reset-to-zero input of the programmable divider 17 in order firstly to force this counter to zero and thus prevent it transmitting when simultaneously the output signal from the counter 28 is at logic level zero and there is not transmission request from the interface 13, and secondly to allow the divider 17 to transmit the frequency F1 or F2 under contrary circumstances.

The output signal from the counter 28 is also applied to one of the inputs of control gate 18, which, when said output signal is at logic level one, and regardless of the level provided by the wire 103, causes the programmable divider 17 to be programmed to transmit at the frequency F1, and which, whenever this output signal is at logic level zero, allows the signal delivered by the wire 103 to pass unchanged.

The output signal from the gate 30 is also applied to an input of the carrier detector circuit 23 in order to prevent a carrier being detected whenever the programmable divider 17 is transmitting.

During a period of dialog between the network 11 and the terminal 5, the terminal 5 receives messages from the network 11 interspersed by time intervals which are set aside for replies from the terminal, these intervals being shorter in duration than one half-period of the counter 28. The counter is returned to zero and held at zero by the carrier detector circuit 23 whenever a message is received, with its output signal then remaining continuously at logic level zero, thereby making the gates 18, 27, and 30 transparent to their other input signals.

In the absence of dialog between the network 11 and the terminal 5, there is a prolonged absence of carrier from the network 11 via the line 3. The counter 28 is then not reset to zero by the carrier detector circuit 23 and it runs its count cycles freely to produce an output signal alternating between the levels zero and one, with the one level signal causing the programmable divider 17 to transmit the frequency F1 and, by closing the gate 27, preventing data being transmitted to the interface 13 throughout the period of time that it is present. The counter 28 switches the remote action terminal between periods of transmission and periods of listening for reception, with the terminal transmitting the frequency F1 throughout an entire half-period and listening for an interrogation from the network 11 throughout the following half-period.

When the remote action terminal 5 is switched on, no carrier is received, there is no data on the wire 103, no transmission request on the wire 105, and the counter 28 is in an arbitrary state. The counter 28 then counts freely and provides a logic level one signal at its output for a half period of arbitrary length depending on its initial state. A signal of frequency F1 is thus transmitted to the line 3 during this half period with the programmable divider 17 being forced to its position for producing the frequency F1 by the one level of the output signal from the counter 28.

Transmission then occurs every other half-period so long as there is no response from the network 11. The network is capable of and required to take advantage of the interval of silence from the remote action terminal 5 in order to use the frequencies F1 and F2 when its turn arises after each period during which the terminal transmits, each such period occupying one-half period of the counter 28.

Receiving signals at the frequencies F1 and/or F2 actuates the carrier detector circuit 23, thereby activating the receive side of the communications adaptor 12, with the data received from the network 11 being transmitted to the interface 13 via the zero crossing detector 24, the demodulator 25, the shaping circuit 26, and the gate 27, which gate is opened by the circuit 23 and the gate 30.

In normal operation, the network 11 interrogates the remote action terminal 5 cyclically by sending a message via the line 3 and using the frequencies F1 and F2.

After network transmission has terminated, the interface 13 responds via the communications adaptor 12 by sending binary data in reply via the wire 103, as indicated by the carrier detector circuits 23. The data transmitted over the wire 103 goes through the gate 18 and is applied to the control input of the programmable divider 17, thereby switching the frequency of the signals it produces from F1 to F2 and back again as a function of the binary value of each of the data bits it receives in succession.

If for any reason whatsoever the communications adaptor does not receive a message from the server during the reception listening period as defined by the counter 28, it returns automatically to sending continuous signal at the frequency F1 during every other half-period, under the control of the counter 28, i.e. during every other minute in the example chosen, and this continues until dialog is begun again by the network 11 retransmitting signals at the frequencies F1 and/or F2.

We claim:

1. A communications adaptor for a remote action terminal connected to a telephone line in parallel with a telephone set to interchange data with a server, via the telephone line, and a remote action network to which the server is connected, the data being interchanged using a frequency band different from that used for telephone set signals, said adaptor and said remote action network both including data transmission means operating by frequency shift-keying between two frequencies, a dialogue taking place between said adaptor and said remote action network by alternative interchange of data, wherein the adaptor includes signalling means for generating a unique signalling on the telephone line which is characteristic of a lack of data reception by the adaptor of data transmitted from the remote action network, for more than a predetermined period of time.

2. A communications adaptor according to claim 1, wherein the signalling means is associated with a frequency detecting means for detecting said two frequencies, said frequency detecting means inserted in a receiver side of the data transmission means, in the adaptor, and said signalling means further being associated with a counting means for counting a period of time, said signalling means triggering the transmission of said unique characteristic signalling in accordance with said frequency detecting means and said counting means, when neither of said two frequencies has been detected for a period of time equal to said predetermined period.

3. A communications adaptor according to claim 1, wherein the generation of a unique signalling corresponds to a specific periodical transmission of one of said two frequencies.

4. A communications adaptor according to claim 2, wherein the counting means controls a data access means for allowing access of data to said telephone line, on a transmitter side of the data transmission means, in the adaptor, to prevent transmission to the telephone line of data other than the unique characteristic signalling as soon as there is a lack of data reception for longer than the predetermined period of time.

* * * * *